US008942930B2

(12) United States Patent
Snyder et al.

(10) Patent No.: US 8,942,930 B2
(45) Date of Patent: Jan. 27, 2015

(54) SYSTEM AND METHOD FOR GENERATION AND CONTROL OF MECHANICAL VIBRATION

(75) Inventors: Andrew P. Snyder, Santa Clara, CA (US); Yu-Jen Hsiao, San Jose, CA (US)

(73) Assignee: Crystal Instruments Corporation, Santa Clara, CA (US)

( * ) Notice: Subject to any disclaimer, the term of this patent is extended or adjusted under 35 U.S.C. 154(b) by 549 days.

(21) Appl. No.: 13/412,426

(22) Filed: Mar. 5, 2012

(65) Prior Publication Data

US 2013/0231878 A1     Sep. 5, 2013

(51) Int. Cl.
*G06F 19/00*     (2011.01)

(52) U.S. Cl.
USPC .......................................................... 702/56

(58) Field of Classification Search
CPC ........ G01M 7/022; G01M 7/06; G05B 19/19; G05B 2219/49281

USPC ...................................... 702/56–57, 182–185
See application file for complete search history.

(56) References Cited

U.S. PATENT DOCUMENTS

| 3,710,082 | A | 1/1973 | Sloane et al. |
| 5,943,634 | A | 8/1999 | Piety et al. |
| 7,426,426 | B2 | 9/2008 | Van Baren |
| 2007/0185620 | A1* | 8/2007 | Van Baren ..................... 700/280 |
| 2010/0305886 | A1* | 12/2010 | Zhuge ............................ 702/56 |

* cited by examiner

*Primary Examiner* — Edward Raymond
(74) *Attorney, Agent, or Firm* — Thomas Schneck

(57) ABSTRACT

A vibration generation system and method independently controls both frequency spectrum and amplitude distribution. Sensed vibration is used in feedback as a control to generate a controlled drive signal applied to a mechanical actuator. The amplitude distribution has a specified statistical characteristic adjusted to match a target characteristic, such as kurtosis, by adjusting a relative proportion of a coherent component in a randomized phase, which is then combined on a frequency-by-frequency basis with the separately adjusted frequency spectrum while in the frequency domain.

14 Claims, 3 Drawing Sheets

SYSTEM AND METHOD FOR GENERATION AND CONTROL OF MECHANICAL VIBRATION

TECHNICAL FIELD

The present invention relates generally to systems for generating and controlling mechanical vibration. More specifically, the invention relates to the electronic control of amplitude, frequency and phase components of randomized mechanical vibrations generated by a mechanical actuator in a shake table.

BACKGROUND ART

Vibration generation is a common means by which products are tested in their development and manufacturing stages. Most products will encounter some form of environmental vibration throughout their lifecycle. Vibration testing is used to ensure product integrity in anticipation of vibrations that may be present, for example, during transportation and in-service use. Any given product will likely be subject to a variety of vibration environments. If a device is mounted in an automobile, for example, then it will have to withstand vibration from driving on various road and terrain surfaces. It is rarely possible to test products in their in-situ environments, so these environments must be simulated with mechanical test systems. A common method of this simulation is with a Random Vibration Controller, which generates a random vibration with a frequency content tailored to match the expected frequency content of the anticipated real-world environment.

In U.S. Pat. No. 3,710,082, E. Sloane and C. Heizman describe a test system that controls a vibratory shaker. The shaker consists of a single-axis, reciprocating, signal-controlled plunger or rod for simulating the vibration of a device under test supported by the shaker. An input signal, i.e. a voltage signal, operates the shaker with some amount of randomness and the shaker vibratory output is monitored. From recordings of the output, one may compute for given times, the statistical mean and the statistical moments of order n relative to the mean.

Most implementations of random vibration controllers generate vibrations that have a Gaussian (also called "normal") amplitude distribution. The variance and frequency content of this vibration can be changed, but the shape of its distribution cannot. This Gaussian distribution is commonly used not because it is best at simulating real-world vibration environments, but because it occurs naturally from the most common ways of generating random waveforms. For resonant systems subjected to random vibration, it can be shown that the response tends to be approximately Gaussian even if the input is not.

However, the vibration occurring in many real world environments is not Gaussian, but has more and larger peaks than what would be predicted from a pure Gaussian distribution. A Gaussian random waveform will typically contain peaks no more than 4 times the RMS of the waveform, while real-world vibration may contain peaks 8 to 10 times the RMS level. Because of this, it is desirable to control the amplitude distribution of the generated vibration, in addition to the frequency content, for more realistic simulation.

Mathematically, the probability distributions that underlie random waveforms can be characterized by central moments. The computations are described, e.g., in the book "Mechanical Vibration and Shock, Random Vibration, Vol. III by C. Lalanne, 2002. The first central moment is always zero and the second central moment is the variance (equal to the square of the standard deviation). The third central moment, often called skewness when divided by the (3/2)-power of the variance, describes the asymmetry of the distribution about the mean.

The fourth central moment, called kurtosis when reduced by division with the square of the variance, is a measure indicative of the presence of peaks in the distribution. A random waveform with a higher kurtosis will contain more "outlier" peaks in the extremes of the distribution. Kurtosis is a scalar value, defined for a given probability distribution as its fourth central moment divided by the square of its second central moment (variance). As defined here, a pure Gaussian distribution always has a kurtosis of 3, while real-world vibration may have a kurtosis of 5 to 8. Because it relates to the frequency of occurrence of these extreme peaks, kurtosis is a useful measure to characterize the distribution of random vibration.

In the aforementioned '082 patent of Sloane and Heizman, the shaker output signal is converted to a digital power spectral density in the frequency domain that is compared to a reference value for output to a multiplier that applies a random phase angle argument before conversion back to the time domain as a driving signal to the shaker. Thus, while the input to the shaker has a random phase angle as part of the driver, feedback from the shaker is used to control the power spectral density of the vibration.

In U.S. Pat. No. 7,426,426, P. Van Baren teaches a test system similar to Sloane et al. but with two parallel feedback loops. In one loop the power spectral density is compared to a reference value, while in a second loop a kurtosis measurement is compared to a reference kurtosis before being applied to a white noise or random signal generator. Thus, Van Baren not only controls the power spectral density of the vibration, but also uses the feedback to apply a bias to the white noise that adjusts the kurtosis of the random vibration. The time signals from the two loops are combined using a convolution filter in the time domain to obtain the drive signal for the shaker.

A similar, but more sophisticated, approach is used by J. Zhuge in published application U.S. 2010/0305886 where kurtosis more strongly influences the input signal by its presence in more than one feedback loop and both Gaussian and non-Gaussian spectrum generators are used in the different loops.

There are other inventions in the prior art that attempt to control kurtosis with different methods. One such method involves generating a random time stream through conventional means, and then applying a non-linear transform to change the distribution. Although this is effective for controlling the distribution, it adds non-linear distortion to the signal and changes its spectral content. Another method involves superimposing shock waveforms over the generated random waveform to add peaks, but this also distorts the spectral content of the signal.

An object of the invention is to devise a vibration control system for a shaker that gives appropriate weight to both the power spectral density and to statistical aspects of the random amplitude distribution.

SUMMARY DISCLOSURE

The invention provides a method and apparatus for simultaneous control of both frequency spectrum and amplitude distribution in a vibration generation system. More specifically, the invention causes a mechanical actuator or shaker to produce a waveform of random character, and controls the frequency content and amplitude distribution of this waveform, accurately and independently, so that measurements taken of the vibration response match pre-defined characteristics, such as having a specified kurtosis. The present invention avoids the complexity of directly generating a white-noise signal with the required kurtosis. The spectral content and the amplitude distribution, in the current method, are controlled in the frequency domain before generating the time stream. Because the distribution is modified by changing only the phase in the frequency domain, there is a minimum effect on the spectral content of the final waveform.

The method for random vibration control uses phase relationships in the frequency domain to modify the amplitude distribution without affecting the frequency content. In particular, an implementation of this method uses one or more impulses in the time domain that are transformed into the frequency domain to become components of the phase of a generated random signal. Further control of the width of the tails of the amplitude distribution can be obtained by adjusting the width of the impulses used in the generation of the phase.

A vibration system for producing randomized mechanical oscillations with simultaneous shaping of both frequency spectrum and phase distribution, comprises a vibration generator driven by an analog drive signal, at least one vibration-sensing transducer for continuously producing an output signal representative of mechanical oscillations from vibration generator, an analog-to-digital converter coupled to the sensing means to convert the output signal into a digital control signal, a computer data processor coupled to the analog-to-digital converter to receive the digital control signal and programmed with stored routines so as to operate upon the control signal to generate a digital drive output computed to produce randomized mechanical oscillations from the vibration generator such that the randomized mechanical oscillations are characterized by having a specified frequency spectrum and amplitude distribution, and a digital-to-analog converter coupled to the computer to convert the digital drive output into the analog drive signal that drives the vibration generator. The computing of the digital drive output carried out by the computer includes steps of (a) transforming the vibration signal into a frequency domain, (b) measuring both a frequency spectrum and a statistical characteristic of the amplitude distribution for the vibration signal, (c) separately comparing the measured frequency spectrum and statistical characteristic against respective reference values of the same, (d) independently adjusting the frequency spectrum and a randomized phase in response to results of the comparison, the randomized phase having a specified non-uniform distribution of phases according to a target of the statistical characteristic, (e) combining the adjusted frequency spectrum and randomized phase components of the signal in the frequency domain, and (f) converting the combined signal back into a time domain to obtain the digital drive output.

DETAILED DESCRIPTION

Figure 1:
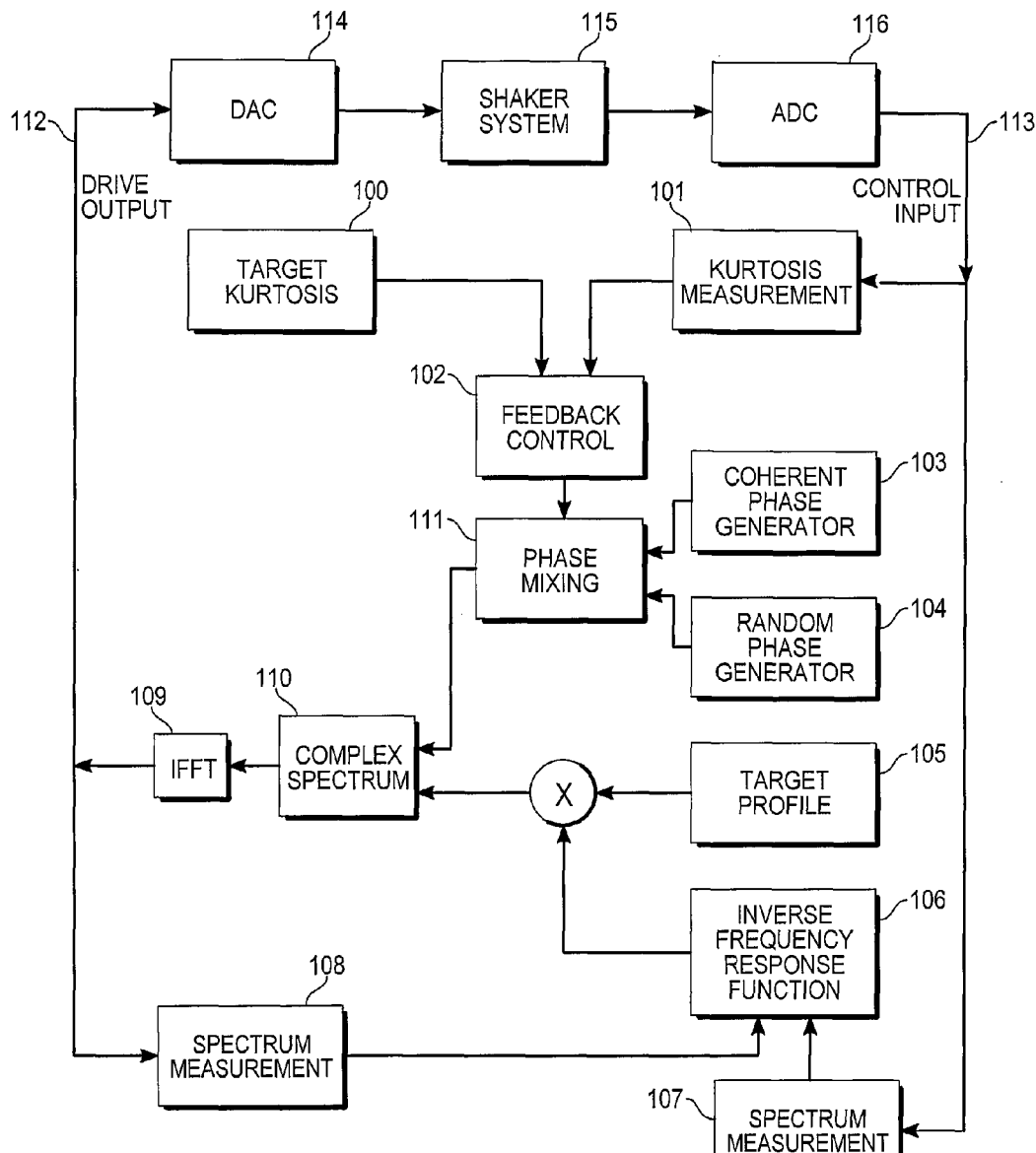
FIG. 1 is a control schematic for an embodiment of a random vibration controller according to the present invention which has kurtosis control independent of frequency content of the resulting vibrations.

In an embodiment of the present invention, kurtosis is the primary metric used to measure and control the vibration distribution, and the vibration controller includes a user-selectable kurtosis target level in a random vibration test system. However, other measurable parameters of some selected statistical distribution can be used as one or more control variables for adjusting a vibration-producing drive signal. A feature of the present invention is that the frequency, amplitude and phase of a randomized vibration can be controlled independently to vary a statistical amplitude distribution without affecting the frequency spectrum of the vibration. The control is carried out using a digitized (sampled) time stream of the sensed vibration, but the computations for making adjustments to the frequency and amplitude distribution are carried out independently and the results are combined in the frequency domain, rather than the time domain, and then converted back into the time domain to generate the vibration drive signal.

In one aspect of this invention, a controlled-kurtosis random vibration controller provides an excitation random waveform (the "drive signal") to a mechanical actuator. This mechanical actuator, which will be referred to as a shaker system, is any device that converts an input waveform into mechanical motion. The motion can be in any direction, and the invention can be extended to motion in multiple directions. The motion produced by the shaker system is measured in some way (electromechanically, optically, etc.) according to any suitable motion parameter (e.g. displacement, velocity, or acceleration). The measured motion is first converted from analog into digital form and then fed back as a digital time stream signal to the controller (the "control signal"). The feedback of the control signal is used to control the characteristics of a drive signal generated by the controller, including its frequency content and, for example, the kurtosis of its amplitude distribution. The desired frequency content of the control signal (the "target profile") is specified by the operator in advance, as is the desired control signal kurtosis ("target kurtosis") or other statistical parameter of the amplitude distribution. The target profile and kurtosis is specified for the control signal, not the drive signal. However, the controller has only direct control over the drive signal, and the control signal is a measurement of the mechanical response of the system excited by the actuator. The controller will continually adjust the drive signal so that the control signal matches the target profile and kurtosis. The drive signal generated by the controller is normally converted from digital into analog form and then applied to the shaker system.

The vibration controller, without the kurtosis control part, consists of a random signal generator and a system inverse Frequency Response Function (FRF) calculator. The random signal generator modifies the target profile, usually specified units of Power Spectral Density, in some way to compensate for the non-uniform response of the mechanical system to the drive signal. One method of this modification, used here by way of example and not by way of limitation, involves multiplication with the system inverse Frequency Response Function. Then, random phase values, uniformly distributed between 0 degrees and 360 degrees, are generated and combined with the modified target profile. Finally an inverse FFT (IFFT) is used to produce a set of samples (a "block") in the time domain. This process is continuously repeated to create a train of blocks that, when combined together, form the continuous drive signal. It can be shown mathematically that the generated time signal will have a Gaussian amplitude distribution, due to the uniform distribution of the random phase.

The system inverse Frequency Response Function may be calculated in a separate but concurrent process. This process takes a copy of the input control signal and output drive signal and creates averaged frequency measurements from them. The inverse FRF can be derived from these frequency measurements.

The random waveform generation process described in the preceding two paragraphs is widely used in random vibration controllers. The current invention adds the ability to modify and control the amplitude distribution of the generated time waveform. This is accomplished by modifying how the phase is generated before the IFFT step. The phase generation is split into two components: a random phase, identical to the phase generated above, and a coherent phase. These two components are added together in varying proportions to produce the phase values that are used in the IFFT process. The coherent phase, by itself, would generate a series of peaks on the output; the mixture of the coherent and random phases generates a waveform with more peaks than the random phase alone would produce. The remaining parts of the drive signal generation process are identical to that described above. Generating the coherent phase and controlling the proportion of the coherent and random phases is the essence of the kurtosis control algorithm presented here.

FIG. 1 represents an exemplary embodiment of a random vibration controller with kurtosis control. The controller is implemented in on a digital computer or microcontroller, and generates a continuous drive output signal 112 using feedback from a continuous control input signal 113. The drive signal is generated as a stream of digital samples, which is converted into a continuous analog signal by a digital to analog converter (DAC) 114. The analog drive signal is the input to a shaker system 115, which can be any system that produces vibration motion from this input. The shaker system measures its response in some way, and produces an output signal. The output signal becomes the control signal for the controller after going through an analog to digital converter (ADC) 116.

This control input signal is continually measured for kurtosis 101, using any statistical means, and for spectral content 107. The spectral measurement usually uses the Fast Fourier Transform (FFT), and may involve additional operations such as applying windowing functions and averaging.

The generated drive output signal is also measured for spectral content 108. The spectrum of both the drive and control signals is then used to calculate the inverse Frequency Response Function (FRF) of the system 106. One method of calculating this inverse FRF is to divide the Auto Power Spectrum of the drive signal by the Auto Power Spectrum of the control signal on a frequency-by-frequency basis (an Auto Power Spectrum is an average of FFT magnitude values over time). Another method involves dividing the complex Cross-Power Spectrum by the Auto Power Spectrum of the control signal. The Cross-Power Spectrum is derived by multiplying the complex frequency spectrum of the drive signal by the conjugate of the complex frequency spectrum of the control signal on a frequency-by-frequency basis, and averaging the result over time. Those skilled in the art will recognize these as usual and common methods of calculating the inverse FRF, and will recognize that there are other methods of calculating this as well.

The inverse Frequency Response Function is then multiplied with the Target Profile 105. The target profile is the desired spectral content of the shaker system response. Multiplying the profile with the inverse FRF corrects for the effects, generally unknown in advance, that the system will have on the drive output before it becomes the control input. The term "system" in this case refers to everything in between the output and the input, including the DAC; the shaker system that may include amplifiers, actuators, mechanical linkages, test structures, and transducers; and the ADC. Using the system inverse Frequency Response Function for this correction, as shown here, is one method of this correction; another method involves using a correction factor derived from the difference between the measured spectrum on the control signal and the desired spectrum.

The calculated drive signal spectrum is then combined with a phase signal. Each FFT magnitude value of the drive spectrum is combined with a phase value. The randomness of these phase values is what gives the generated output its random character. The drive signal spectrum magnitudes combined with phase are converted to a complex spectrum 110 suitable for the inverse Fast Fourier Transform (IFFT) 109. Any of a number of standard techniques commonly used in practice, such as windowing or overlap, may also be applied at this stage.

The phase consists of two components. The first component, termed the random phase 104, consists of a set of Independently and Identically Distributed (IID) phase values uniformly distributed over the entire phase range. The second component, termed the coherent phase 103, consists of a set of phase values that are related in such a way as to produce one or more peaks in the output. Since each phase value controls the phase of a discrete frequency component generated in the output, the phase of two or more of these components can be manipulated in such a way to cause their peaks line up and produce a combined peak, or combined peaks, larger than what would be expected from a purely random phase distribution. Increasing the incidence of these outlier peaks in the output increases its kurtosis, which in turn increases the kurtosis measured in the response of the shaker system.

The kurtosis of the output can be controlled by proportioning the phase between the coherent and random components 111. Using more of the coherent component will result in more outlier peaks on the output and higher kurtosis. This phase mixing can be controlled by feedback 102 from the measured kurtosis of the control signal 101 compared against the desired or target kurtosis 100. An example implementation of this feedback control would be to make the proportion of coherent phase proportional to the difference between the target and measured kurtosis and/or the integration of this difference over time.

Figure 3A:
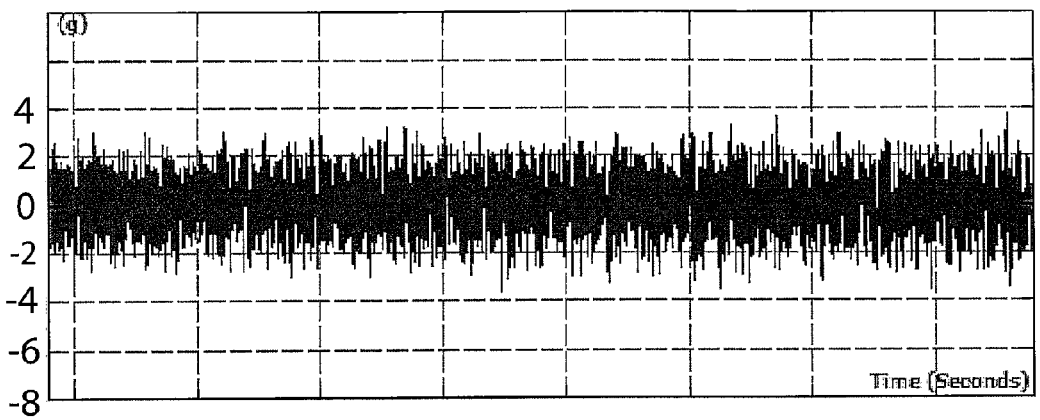
FIGS. 3a and 3b are equivalent time waveforms produced by a standard random vibration controller with Gaussian distribution (FIG. 3a), i.e. kurtosis of 3, and another with a kurtosis of 7 (FIG. 3b).
Figure 3B:
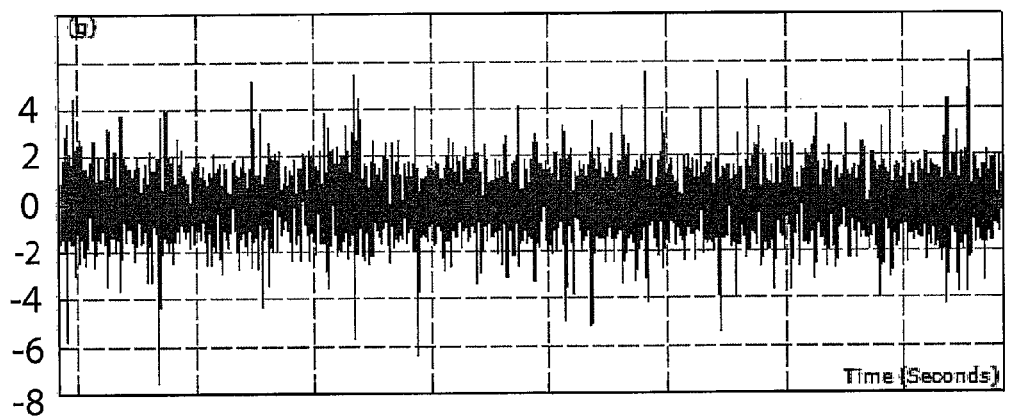

FIG. 3 shows equivalent time waveforms produced by a standard random vibration controller with Gaussian distribution (3a) and a waveform produced by the method described herein with a kurtosis of 7 (3b). As can be seen, the signal with higher kurtosis has many peaks that exceed the range of the regular, Gaussian-distributed signal.

Figure 4:
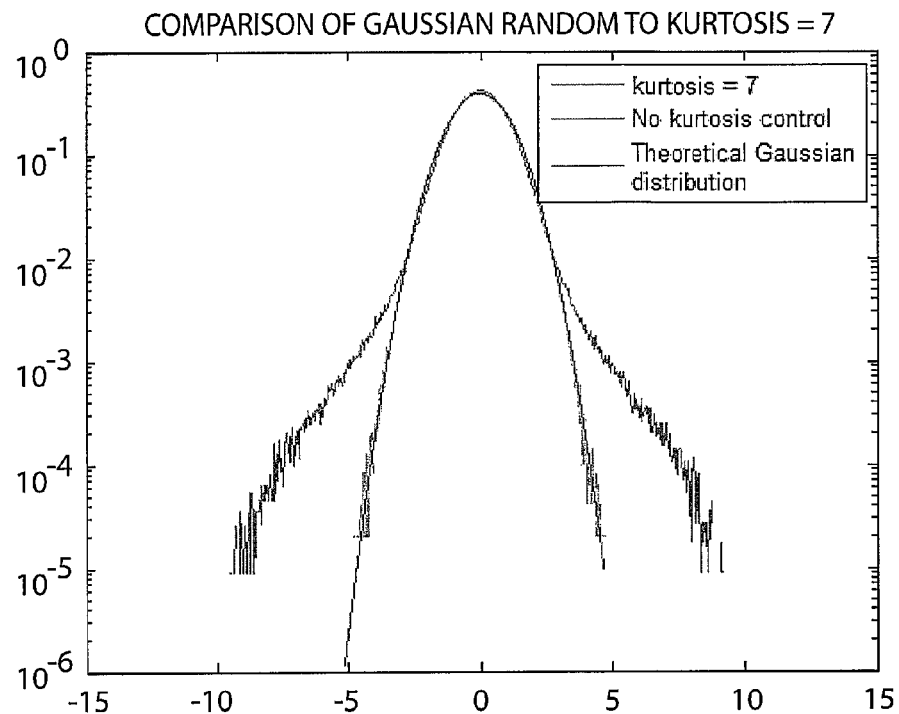
FIG. 4 is a graph of measured amplitude distribution for the two waveforms of FIGS. 3a and 3b. A theoretical Gaussian distribution is overlaid with the measured distributions.

FIG. 4 shows a comparison of the amplitude distribution of the two waveforms from FIG. 3. The higher-kurtosis signal has visibly longer tails in its distribution. For reference, a theoretical Gaussian distribution with the same mean and variance is also shown.

Figure 2:
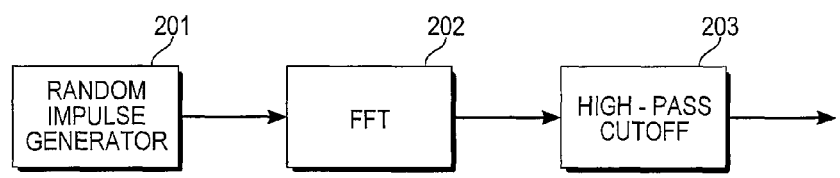
FIG. 2 shows details of an example embodiment of a coherent phase generator for use in the controller of FIG. 1.

An example implementation of the Coherent Phase Generator is shown in FIG. 2. In this process, the coherent phase is generated from an impulse or a series of impulses in the time domain 201. An impulse is defined as a time domain block where all samples are zero except at one location within the block, where 1 or more contiguous samples are set to unity. These impulses can be located randomly within the block. This impulse is then passed through a Fast Fourier Transform 202, which creates a frequency-domain representation of the impulse. This representation looks like a serious of sine waves. Optionally, a high-pass cutoff 203 can be used to truncate the coherent phase values below a specified frequency, which may help increase the stability and dynamic range of the output signal.

Figure 5:
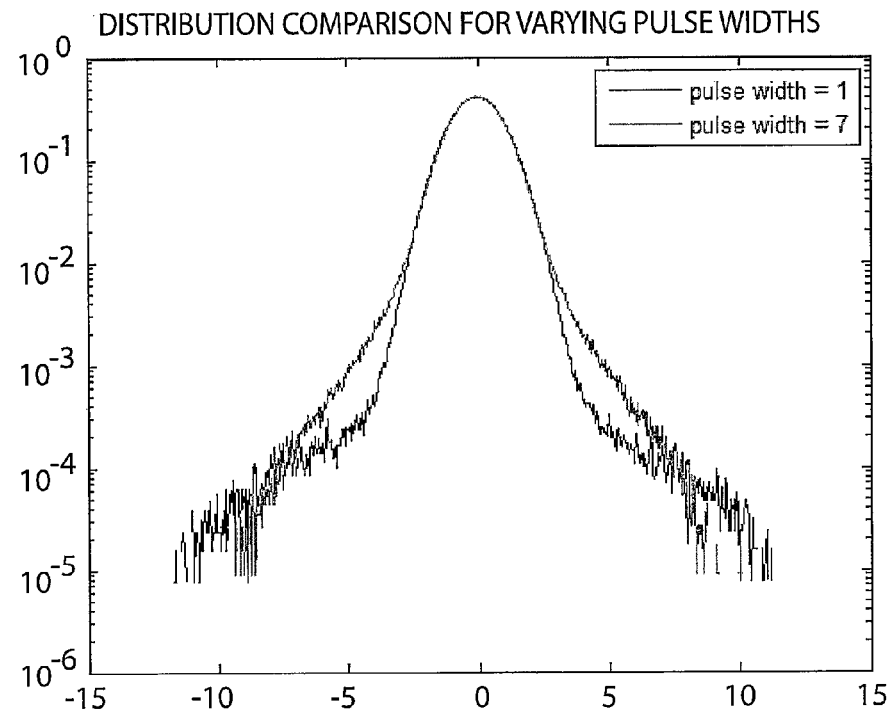
FIG. 5 is a graph of measured amplitude distribution for two waveforms, both having a kurtosis of 7, but with one having an impulse width of 1 in the coherent phase generator, and the other having an impulse width of 7.

In addition, this method of coherent phase generation allows control over the output distribution beyond the kurtosis measurement. Using impulses that are wider will generally produce an output with more peaks, but at lower amplitude, than narrow peaks. This means that the tails of the distribution are longer for narrower impulses. FIG. 5 shows the measured distribution of the output of this process when the impulse width is 1 and when the impulse width is 7. Both of these distributions have a kurtosis of 7.

The invention claimed is:

1. A method for controlling a vibration-producing device, comprising:
   continuously sensing vibration from the device to obtain a vibration signal in a time domain;
   transforming the vibration signal into a frequency domain;
   measuring both a frequency spectrum and an amplitude distribution of the vibration signal;
   separately comparing the measured frequency spectrum and at least one statistical characteristic of the amplitude distribution against respective reference values of the same;
   independently adjusting both the frequency spectrum and a randomized phase in response to results of the comparison, the randomized phase having a specified non-uniform distribution of phases according to a target of the statistical characteristic;
   combining, in the frequency domain, the adjusted frequency spectrum with the randomized phase on a frequency-by-frequency basis;
   converting the combined signal back into a time domain to obtain a drive signal; and
   applying the drive signal to the vibration-producing device.

2. The method as in claim 1, wherein the at least one statistical characteristic of the amplitude distribution includes kurtosis.

3. The method as in claim 1, wherein the randomized phase with specified non-uniform distribution has both a purely random component and a coherent component, with a relative proportion of the coherent component being adjusted to obtain a target statistical distribution of amplitude in accord with the results of the comparison.

4. The method as in claim 3, wherein the coherent component of the randomized phase is generated from a series of impulses, each impulse randomly positioned within a distinct time domain block, the series of impulses being converted to a phase domain signal by a specified domain transformation.

5. The method as in claim 4, wherein the specified domain transformation is a Fast Fourier Transform.

6. The method as in claim 3, further defined by applying a high-frequency cutoff filtering to the transformed phase domain signal.

7. The method as in claim 3, wherein independent adjusting of the randomized phase comprises increasing the relative proportion of the coherent component whenever a measured kurtosis of the amplitude distribution is less than a user-specified target kurtosis and decreasing the relative proportion of the coherent component whenever the measured kurtosis of the amplitude distribution is greater, than the user-specified target kurtosis.

8. The method as in claim 1, wherein the amplitude distribution has a non-Gaussian statistical characteristic.

9. The method as in claim 1, wherein the amplitude distribution contains amplitude peaks at least eight times larger than a root-mean-square of the vibration signal.

10. The method as in claim 1, wherein the amplitude distribution is characterized by a kurtosis in range from 5 to 8.

11. The method as in claim 1, wherein comparing the measured frequency spectrum and independently adjusting the frequency spectrum comprises dividing an auto power spectrum of the drive signal by an auto power spectrum of the vibration signal on a frequency-by-frequency basis to obtain an inverse frequency response function of the vibration signal, then multiplying the inverse frequency response function by a target spectrum profile on a frequency-by-frequency basis.

12. The method as in claim 1, wherein comparing the measured frequency spectrum and independently adjusting the frequency spectrum comprises multiplying a complex frequency spectrum of the drive signal by a conjugate of a complex frequency spectrum of the vibration signal on a frequency-by-frequency basis and averaging over time to obtain a complex cross-power spectrum, then dividing the complex cross-power spectrum by an auto power spectrum of the vibration signal on a frequency-by-frequency basis to obtain an inverse frequency response function of the vibration signal, then multiplying the inverse frequency response function by a target spectrum profile on a frequency-by-frequency basis.

13. The method as in claim 1, wherein converting the combined signal back into a time domain comprises performing a domain transformation to obtain a set of samples for successive time blocks, then combining a train of blocks to form a continuous drive signal.

14. A vibration system for producing randomized mechanical oscillations with simultaneous shaping of both frequency spectrum and phase distribution, comprising:
   a vibration generator driven by an analog drive signal;
   at least one vibration-sensing transducer for continuously producing an output signal representative of mechanical oscillations from vibration generator;
   an analog-to-digital converter coupled to the sensing means to convert the output signal into a digital control signal;
   a computer data processor coupled to the analog-to-digital converter to receive the digital control signal and programmed with stored routines so as to operate upon the control signal to generate a digital drive output computed to produce randomized mechanical oscillations from the vibration generator such that the randomized mechanical oscillations are characterized by having a specified frequency spectrum and amplitude distribution, the computing of the digital drive output carried out by the computer including steps of (a) transforming the vibration signal into a frequency domain, (b) measuring both a frequency spectrum and a statistical characteristic of the amplitude distribution for the vibration signal, (c) separately comparing the measured frequency spectrum and statistical characteristic against respective reference values of the same, (d) independently adjusting the frequency spectrum and a randomized phase in response to results of the comparison, the randomized phase having a specified non-uniform distribution of phases according to a target of the statistical characteristic, (e) combining the adjusted frequency spectrum and randomized phase components of the signal in the frequency domain, and (f) converting the combined signal back into a time domain to obtain the digital drive output; and a digital-to-analog converter coupled to the computer to convert the digital drive output into the analog drive signal that drives the vibration generator.

\* \* \* \* \*